United States Patent [19]
Kondo et al.

[11] Patent Number: 5,499,057
[45] Date of Patent: Mar. 12, 1996

[54] APPARATUS FOR PRODUCING A NOISE-REDUCED IMAGE SIGNAL FROM AN INPUT IMAGE SIGNAL

[75] Inventors: Tetsujiro Kondo; Takashi Horishi; Yasuhiro Fujimori, all of Kanagawa; Takeharu Nishikata, Chiba, all of Japan

[73] Assignee: Sony Corporation, Tokyo, Japan

[21] Appl. No.: 293,918

[22] Filed: Aug. 22, 1994

[30] Foreign Application Priority Data

Aug. 27, 1993 [JP] Japan ................................. 5-213209

[51] Int. Cl.⁶ ...................................................... H04N 5/21
[52] U.S. Cl. ........................................... 348/607; 348/624
[58] Field of Search ........................... 348/420, 471, 348/607, 608, 615, 616, 617, 618, 624

[56] References Cited

U.S. PATENT DOCUMENTS

| | | |
|---|---|---|
| 4,442,454 | 4/1984 | Powell . |
| 4,549,212 | 10/1985 | Bayer . |
| 4,670,851 | 6/1987 | Murakami et al. . |
| 4,802,232 | 1/1989 | Altes . |
| 4,894,713 | 1/1990 | Delogne et al. . |
| 4,979,136 | 12/1990 | Weiman et al. . |
| 5,060,285 | 10/1991 | Dixit et al. . |
| 5,416,606 | 5/1995 | Matsumi et al. ...................... 358/335 |

FOREIGN PATENT DOCUMENTS

0450664  10/1991  European Pat. Off. .

*Primary Examiner*—Victor R. Kostak
*Assistant Examiner*—Nathan J. Flynn
*Attorney, Agent, or Firm*—William S. Frommer

[57] ABSTRACT

Apparatus are provided for producing a noise-reduced image signal from an input image signal having relatively more noise. The input image signal is divided into a number of block signals. A class code is produced for each of the block signals and used to produce low noise image data which is either output as a pixel or block of the noise-reduced image signal or is used to produce the same.

15 Claims, 10 Drawing Sheets

APPARATUS FOR PRODUCING A NOISE-REDUCED IMAGE SIGNAL FROM AN INPUT IMAGE SIGNAL

BACKGROUND OF THE INVENTION

The present invention relates to apparatus for reducing noise in an image signal.

Figure 1:
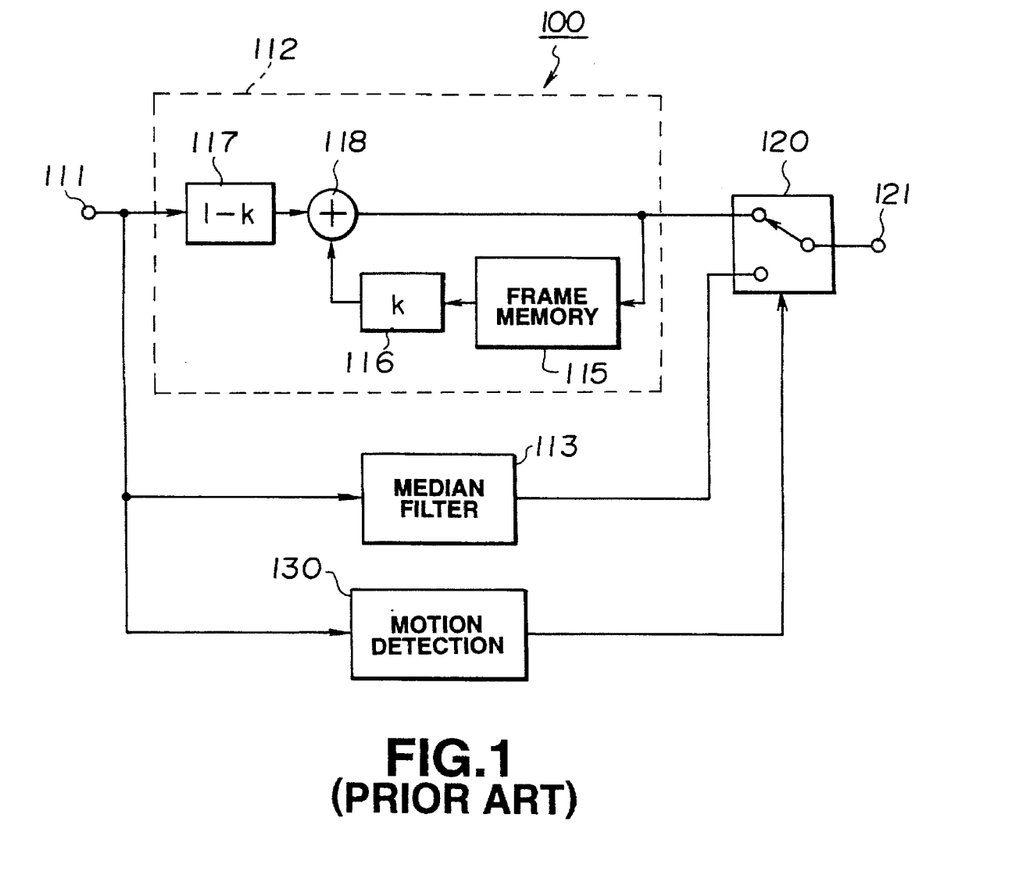
FIG. 1 is a block diagram of a conventional apparatus for reducing noise in an image signal.

Conventional apparatus for reducing noise in image signals employ a variety of filtering techniques, such as a three-dimensional processing technique which may be carried out using an apparatus such as that illustrated in FIG. 1. In the apparatus of FIG. 1, an input signal, such as a digital image signal, is received at an input terminal 111. The input signal is supplied both to a still picture noise reducing filter 112 and a moving picture noise-reducing filter 113 each of which reduces the noise content of the input image signal and supplies a filtered, noise-reduced output image signal to a respective fixed terminal of a switching circuit 120.

The input image signal received at the terminal 111 is also provided to a motion detection circuit 130 which serves to detect motion in the input image signal on a pixel-by-pixel basis. The motion detection circuit 130 produces a motion detection signal which it supplies as a control signal to the switch 120 in order to control the selection of the output of the filter 112 or the filter 113 to be supplied at an output terminal 121 of the FIG. 1 apparatus. That is, when the motion detection circuit 130 determines that the input image signal is a still picture, the output of the still picture filtering circuit 120 is supplied to the output terminal 121, while when the motion detection circuit 130 determines that the input image signal is a moving picture, the output of the moving picture filter circuit 113 is supplied at the output 121.

Accordingly, the apparatus of FIG. 1 adaptively responds to motion in the input image signal for reducing its noise content.

The still picture noise-reducing filter 112 is a mean value filter which serves to smooth the input image signal along the time axis. The filter 112 includes a frame memory 115, multiplication circuits 116 and 117, and an adding circuit 118. The frame memory 115 outputs the data of a frame preceding that of the input image signal to the multiplication circuit 116 wherein the output data is multiplied by a factor k, where $0 < k < 1$. The input image signal is multiplied in the multiplication circuit 117 by a factor $(1-k)$. The outputs of the multiplication circuits 116 and 117 are supplied to the adding circuit 118 which serves to add these signals and supply the same to the output of the filter 112 as well as to the frame memory 115 for storage therein.

The moving picture noise-reducing filter 113 is a median-value filter or median filter which is a kind of spatial filter. The filter 113 produces each pixel at a value equal to the average of the value of the input pixel and those of the immediately preceding and succeeding pixels.

A problem encountered in the use of the FIG. 1 apparatus is that the picture deteriorates as a result of filtering, especially at the edges between objects or other image features. A further conventional technique has been proposed wherein it is attempted to locate such edges and then preserve edge information by modifying filter characteristics at edge locations. However, the ability to detect such edges is limited. For example, noise can be mistaken for an edge, and as a consequence, such noise is not removed.

The characteristics of the noise present in an image signal depend on the source of the noise, so that the noise characteristics vary depending upon the particular image signal processing system employed. It will be seen, therefore, that conventional noise-reducing techniques are limited by their inability to adapt fully to the shape or configuration of the picture represented by the image signal, or to the particular image signal processing system.

OBJECTS AND SUMMARY OF THE INVENTION

It is an object of the present invention to provide apparatus for reducing noise in image signals which alleviate the problems inherent in conventional noise-reducing apparatus.

It is another object of the present invention to provide such an apparatus for reducing noise in image signals which adapts to picture content as well to the particular type of image signal processing system employed.

In accordance with an aspect of the present invention, an apparatus for producing a noise-reduced image signal from an input image signal having relatively more noise than the noise-reduced image signal comprises: block producing means for producing a plurality of noise-containing block signals from the input image signal, each of the noise-containing block signals representing a portion of an image represented by the input image signal; class code producing means for producing a class code for each of the plurality of noise-containing block signals, each class code identifying low noise image data corresponding with an image portion and having a noise level lower than that of a noise-containing block for which the class code was produced; and noise-reduced image signal producing means for producing the noise-reduced image signal based on the class codes produced by the class code producing means.

The foregoing, as well as other objects, features and advantages of the present invention will be apparent from the following description of certain advantageous embodiments thereof when read in connection with the accompanying drawings wherein corresponding elements are identified by the same reference numerals in the several drawing figures thereof.

DETAILED DESCRIPTION OF CERTAIN ADVANTAGEOUS EMBODIMENTS

Figure 2:
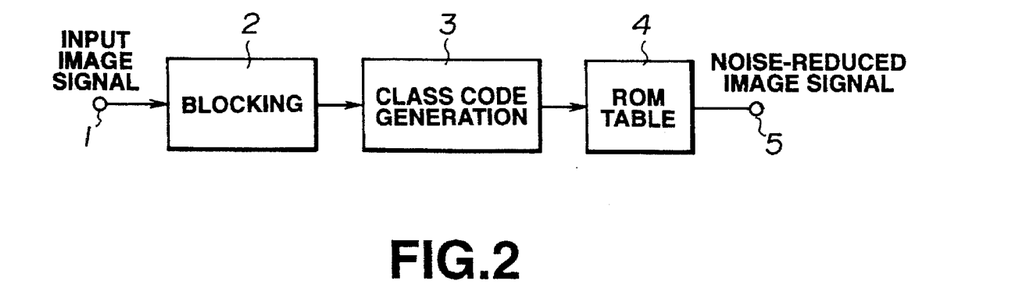
FIG. 2 is a block diagram of an embodiment of an apparatus for producing a noise-reduced image signal from an input image signal in accordance with the present invention.
Figure 3A:
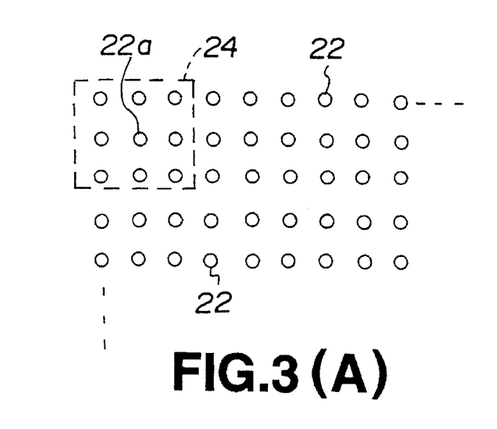
FIGS. 3(A) through 3(D) are schematic diagrams illustrating a block signal formation technique for use in training and operating the FIG. 2 embodiment.
Figure 3B:
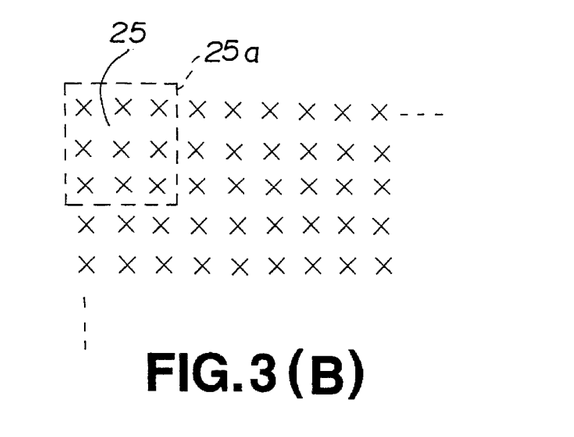
Figure 3C:
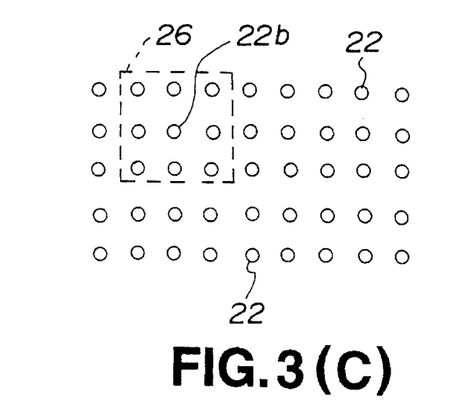

With reference to the drawings and in particular FIG. 2 thereof, an apparatus for producing a noise-reduced image signal from an input image signal which has a higher noise level than the noise-reduced image signal is illustrated in block form therein. The input image signal is received at an input terminal 1 and supplied therefrom to a blocking circuit 2 which produces a number of block signals from the input image signal each of which represents a portion of an image represented by the input image signal. For example, as illustrated in FIG. 3(A), the input image signal is shown therein in the form of a two-dimensional array of pixels 22 arranged in rows and columns so that together they produce a two-dimensional image. In the example of FIG. 3(A) the blocking circuit 2 produces a first block signal in the form of a 3×3 pixel block 24 at the upper left-hand corner of the array centered on a pixel 22a. The blocking circuit also produces a further block signal 26 as illustrated in FIG. 3(C) centered on a pixel 22b. Essentially, the blocking circuit 2 divides the input image signal into block signals of predetermined size each centered on a respective one of the pixels of the input image signal such that a block is produced for each pixel thereof except for pixels along the edge of the image. While the blocks of FIGS. 3(A) and 3(B) are arranged as three rows and columns of pixels, other arrangements may instead be employed. In certain exemplary embodiments of the invention, the input image signal is divided into 8×8 pixel blocks, while in others the blocks have different dimensions.

The block signals are supplied by the blocking circuit 2 to a class code generation circuit 3 which produces a class code for each of the block signals supplied thereto. Each class code, in turn, identifies low noise pixel data corresponding with the central pixel (22a, 22b, etc.) of each corresponding block signal from which the code was produced. The low noise pixel data are produced from low noise image data in accordance with a training process described below so that the low noise pixel data have a noise level which is lower than that of the relatively more noisy block signal for which the corresponding class code was produced.

The low noise pixel data are stored in uncompressed form in a ROM 4 as a table of values each associated with its respective class code. The class codes may be used, for example, as read addresses in order to output their corresponding low noise pixel data from the ROM 4. In the alternative the read addresses may be generated based on the class codes.

Accordingly, for each block signal produced by the blocking circuit 2 and supplied to the class code generation circuit 3, respective low noise pixel data is output from the ROM 4 to an output terminal 5 thus to produce the noise-reduced image signal. Advantageously, the block signals are produced for each pixel of the input image signal (with the exception of edge pixels) one line at a time to output the noise-reduced image signal as either a sequence of fields or frames. The edge pixels need not be processed as they do not normally appear when the image signal is displayed. The low noise pixel data may be stored in compressed or uncompressed form.

The learning process for the embodiment of FIG. 2 will now be described with reference to FIGS. 3(A) through 3(D) and the flow diagram of FIG. 4. Learning is carried out with the use of a relatively noisy input image signal (indicated as S1) and a noise-reduced image signal (S2) representing the same image. With reference to FIG. 5, a noise-reduced image signal may be produced from multiple (n) still picture frames of the input image signal by averaging the n frames along the time axis t. In another technique, the noise-reduced image signal is produced as the output of a video camera, while the input image signal is produced by processing the output of the video camera by a system which introduces noise into the image signal of the kind which it is desired to remove by means of the apparatus of FIG. 2. For example, the image signal may be transmitted over a transmission line or recorded and reproduced by a VTR.

In step S3, the input image signal is separated into block signals. The blocking step may be carried out in a number of ways, such as by simply extracting the pixels of the particular blocks of interest as the block signals. Advantageously, however, where the input image signal is provided in the form of pixel data, in the blocking step the pixel data are subjected to data compression such as adaptive dynamic range compression (ADRC), differential PCM (DPCM), vector quantization (VQ), discrete cosine transform (DCT) or other form of data compression.

In carrying out ADRC, the pixel data are separated into blocks as described above, a dynamic range is defined for each block based on a maximum pixel value and a minimum pixel value thereof and a number of quantizing bits for the block is selected based on the dynamic range for encoding each of the pixels thereof. The minimum pixel value is subtracted from each of the pixels of the block and the remainder is encoded using the selected number of quantizing bits. Accordingly, the encoded block includes the re-encoded pixel data, together with dynamic range data and data representing one of the maximum and minimum values. ADRC is useful to eliminate the effect of DC luminance while preserving the basic picture pattern. The number of bits used to encode the pixel data is selected to preserve the pattern information while minimizing the necessary number of bits.

Figure 3D:
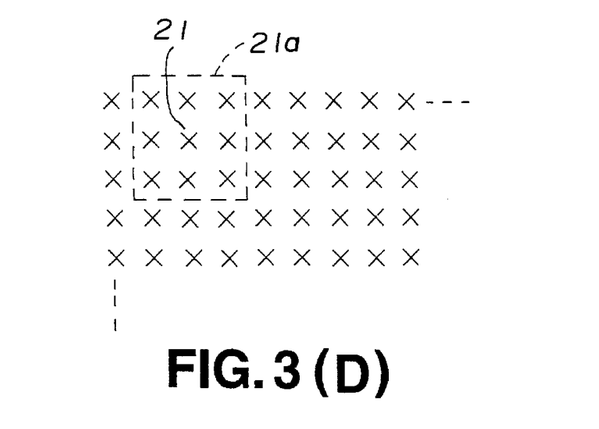

In a step S4 low noise pixel data corresponding to each block of the input image signal is separated from the low noise image signal. With reference to FIGS. 3(A) and 3(B), corresponding to the block 24 of the input image signal (see FIG. 3(A)), a central pixel 25 of a corresponding block 25a of the low noise image signal is separated therefrom (see FIG. 3(B)). With reference to FIGS. 3(C) and 3(D), corresponding to the block 26 of the input image signal (see FIG. 3(C)), a central pixel 27 of a corresponding block 27a of the low noise image signal is separated therefrom (see FIG. 3(D)). This process is repeated for all such blocks and pixels.

When the input image signal has been separated into blocks (and perhaps compressed as described above) in the step S3, a clustering step S5 is then carried out for the various block signals of the input image signal. In the clustering step, a class code is produced for each of the block signals produced in the step S3. One way to produce the class codes is simply to concatenate the pixel data of each block signal in a predetermined order. However, if the data are uncompressed this can produce an impracticably large class code which would require the use of a ROM having an extremely large capacity. By carrying out ADRC in the blocking step S3, however, the class code for each block signal may then be generated by concatenating the requantized pixel data which is encoded with fewer bits thus to advantageously reduce the number of classes. The class code CC of each block produced in this manner may be defined by the following relationship:

$$CC = \sum_{i=1}^{3} q_i (2^P)^{i-1} \quad (1)$$

wherein $q_i$ represents the ADRC code of a respective pixel i (in the present example i=1 to 3) and p represents the number of bits used to encode each pixel by ADRC. Other techniques for forming class codes will be apparent from the foregoing description, as the class codes need only identify the picture patterns inherent in the various block signals.

In a training step S6, each pixel 25, 27, etc. of the noise-reduced image signal produced in the step S4 is matched with the class code of the corresponding block signal of the input image signal produced in the step S5 to cluster the pixels of the low noise image signal under their respective class codes. In certain embodiments, those pixels corresponding to the same class code are averaged to produce an optimal pixel value, while in others an optimal pixel value is selected from those having the same class code or produced using fewer than all such values.

In the step S7 it is determined whether the above process has been carried out for all of the blocks of the input image signal and the noise-reduced image signal. If not, processing returns to the steps S3 and S4. However, if all the blocks have been thus processed, a mapping table S8 is produced and stored in the ROM 4 of FIG. 2. Other types of memory devices may be used in place of the ROM 4. For example, a flash memory or other non-volatile memory device may be used. In the alternative, the mapping table may be read from a tape, disk or other storage device and stored in a RAM for use in carrying out the noise reduction process.

Accordingly, the embodiment of FIG. 2 substitutes low noise pixel data for relatively higher noise input image data by recognizing a respective image pattern of an image block represented by a respective block signal of the input image signal to identify the corresponding low noise pixel data. The apparatus of FIG. 2 thus adapts to the picture content so that it is effective to reduce noise without regard to picture content (for example, at the edges of image objects or features). Moreover, by training the apparatus with the use of a noise-reduced image signal and a corresponding input image signal which has been processed by means of a system of the kind which is expected to generate the noise which is to be reduced by means of the FIG. 2 apparatus, the noise reduction technique adapts also to the characteristics of the noise which is to be reduced.

Figure 6:
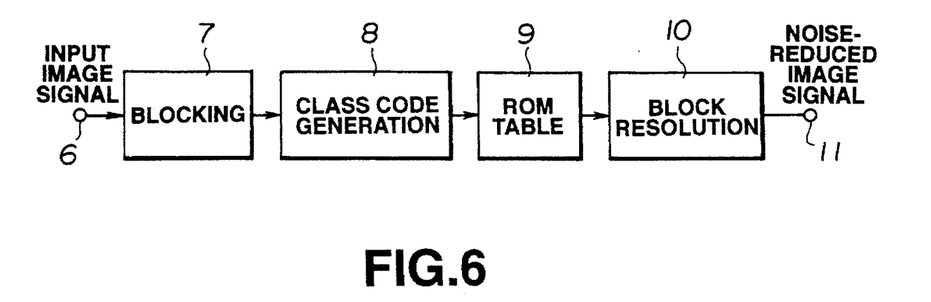
FIG. 6 is a block diagram of an embodiment of another apparatus for producing a noise-reduced image signal from an input image signal in accordance with the present invention.

Referring now to FIG. 6, a block diagram of a further apparatus for producing a noise-reduced image signal from an input image signal having a higher noise level than the noise-reduced image signal is illustrated therein in block form. In the apparatus of FIG. 6, an input image signal is received at an input terminal 6 and supplied therefrom to a blocking circuit 7 which operates in a manner similar to the blocking circuit 2 of FIG. 2 by separating the input image signal into block signals and providing the same either in compressed or uncompressed form. The block signals produced by the blocking circuit 7 are supplied thereby to a class code generation circuit 8 which, similarly to the class code generation circuit 3 of FIG. 2, produces a class code characteristic of each block signal received from the blocking circuit 7. Each class code produced by the circuit 8 in response to each block signal is supplied to a ROM 9 where it is employed as an address (or to produce an appropriate address) to access a corresponding low noise block signal stored therein (either in compressed or uncompressed form) and read thereby to a block resolution circuit 10.

Unlike the ROM 4 of FIG. 2, the ROM 9 outputs the data of an entire block in response to a class code received thereby. The various block signals supplied by the ROM 9 are rearranged by the block resolution circuit 10 to form fields or frames of a noise-reduced image signal which is output as a sequence of image signal lines at an output terminal 11. As in the case of ROM 4 of FIG. 2, the ROM 9 may be replaced by a flash memory or other non-volatile memory device. In the alternative, the data stored in ROM 9 may instead be read from a tape, disk or other storage device and stored in a RAM for the same purpose.

Figure 4:
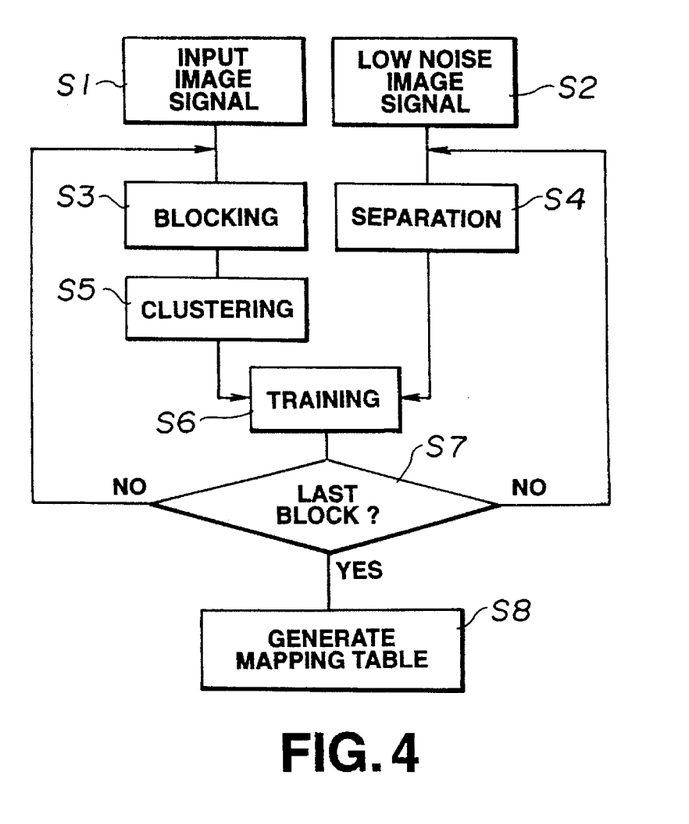
FIG. 4 is a flow chart for illustrating a training method for the embodiment of FIG. 2.
Figure 5:
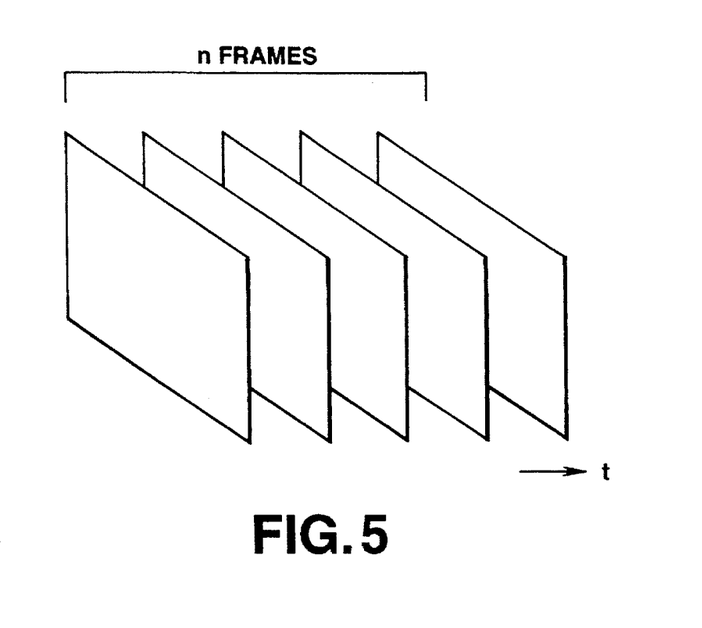
FIG. 5 is a schematic diagram illustrating one method for producing a low noise image signal for use in training the apparatus of FIG. 2.
Figure 7A:
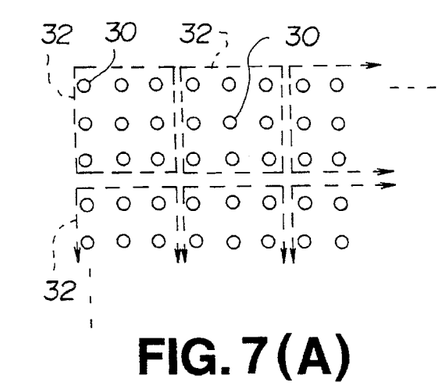
FIGS. 7(A) and 7(B) illustrate the formation of block signals in accordance with a training technique for the apparatus of FIG. 6.
Figure 7B:
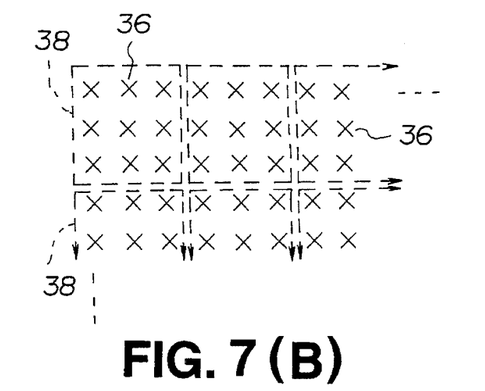

Training to produce the table stored in the ROM 9 is carried out in a manner similar to that of the ROM 4 of FIG. 2 as illustrated in FIG. 4, except that entire block signals are stored in the ROM 9 for each class code. The training technique for the apparatus of FIG. 6 is explained with reference to FIGS. 7(A) and 7(B). FIG. 7(A) illustrates the two-dimensional pixel array of a relatively noisy input image signal, while FIG. 7(B) illustrates the two-dimensional pixel array of a low noise image signal representing the same image as the input image signal of FIG. 7(A) but having a lower noise level. As shown in FIG. 7(A) the two-dimensional pixel array is divided into block signals 32 of predetermined size. While 3×3 pixel block signals are illustrated in FIG. 7(A) as an example, 8×8 pixel block signals as well as block signals of other sizes and shapes may be employed. The low noise image signal of FIG. 7(B) also includes a plurality of pixels 36 divided into block signals 38 each of which corresponds to a respective one of the block signals 32 of the input image signal of FIG. 7(A). Accordingly, in order to train the system of FIG. 6, each of the block signals 32 of the input image signal is used to produce a class code, and the corresponding block signal 38 of the low noise image signal is stored in association with the class code of the corresponding block 32. As in the case of the training procedure of FIG. 4, block signals 38 having the same class code may be averaged, one or more may be discarded in favor of another block signal 38, or else fewer than all block signals 38 having the same class code may be used to produce a block signal to be stored in ROM 9.

Figure 8:
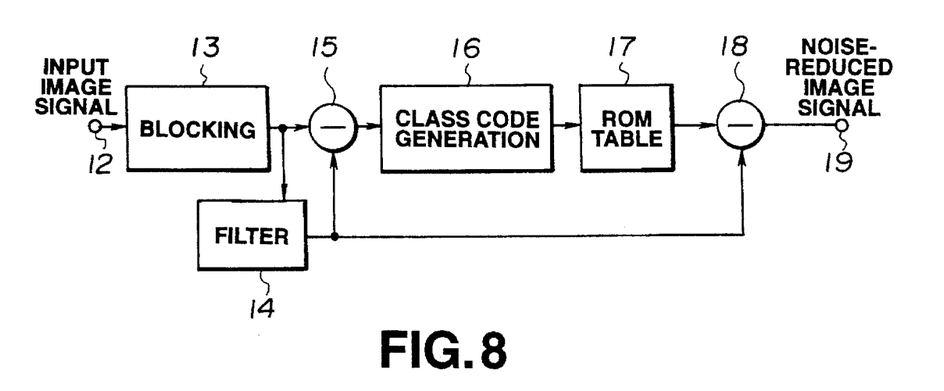
FIG. 8 is a block diagram of a further embodiment of an apparatus for producing a noise-reduced image signal from an input image signal in accordance with the present invention.

A further embodiment of an apparatus for producing a noise-reduced image signal from an input image signal is illustrated in block form in FIG. 8. In the apparatus of FIG. 8, an input image signal is received at an input terminal 12 and supplied to a blocking circuit 13 which divides the input image signal into a plurality of block signals which it then supplies both to a filter 14 and to an input of a subtracting circuit 15. The filter 14 is a conventional noise reducing filter suitable for reducing noise in an image signal. One exemplary noise reducing filter which may be employed as the filter 14 is a median-value filter. The filter 14 supplies a filtered image signal at an output thereof coupled with a further input of the subtracting circuit 15. The subtracting circuit 15 produces a difference image signal representing differences between each filtered block signal from the filter 14 and each block output by the blocking circuit 13, and supplies each difference block signal to a class code generation circuit 16. The class code generation circuit 16 responds to each difference image signal by supplying a class code therefor which it supplies to a ROM 17 as an address (or else which is used to produce an address) to read out a corresponding low noise difference image signal (in the form of low noise pixel or block data) stored therein in compressed or uncompressed form. The ROM 17 may be replaced by another suitable memory device.

The low noise difference image signal output by the ROM 17 is supplied as an input to an adding circuit 18 having a second input coupled with the output of the filter 14 to receive the data of each filtered block signal. The adding circuit 18 serves to add the low noise difference image data output by the ROM 17 with corresponding data of the filtered block signal to produce the data of a noise-reduced image signal output at a terminal 19. Accordingly, once all of the blocks of the input image signal have been thus processed, the noise-reduced image signal is supplied at the output terminal 19.

A technique for training the apparatus of FIG. 8 will now be explained in connection with the flow chart of FIG. 9. In accordance with the training procedure of FIG. 9, in a step S10 an input image signal having a noise content is separated into blocks, and in a companion step S11 a corresponding low noise image signal representing the same image as the input image signal is separated into corresponding blocks. In steps S12 and S13 the input image signal and the low noise image signal, respectively, are subjected to filtering in the manner carried out by the filter 14 of FIG. 8. Then in steps S14 and S15 the filtered block signals of the input image signal and the low noise image signal, respectively, are subtracted from the corresponding unfiltered block signals to produce respective difference image data. In a step S16 following the step S14, the difference image data produced in the step S14 undergoes clustering to produce a class code for each of the difference image data corresponding with each block signal of the input image signal, and in a subsequent step S20, the class code produced in the step S16 is matched with the difference image data corresponding to the block signal of the low noise image signal which, in turn, corresponds to the block signal of the input image signal from which the class code was produced. As indicated by a subsequent block S22, this process is repeated until the last block has been so processed, whereupon as indicated by the step S24 a mapping table for the class codes and difference block data is generated and stored in the ROM 17.

Figure 10:
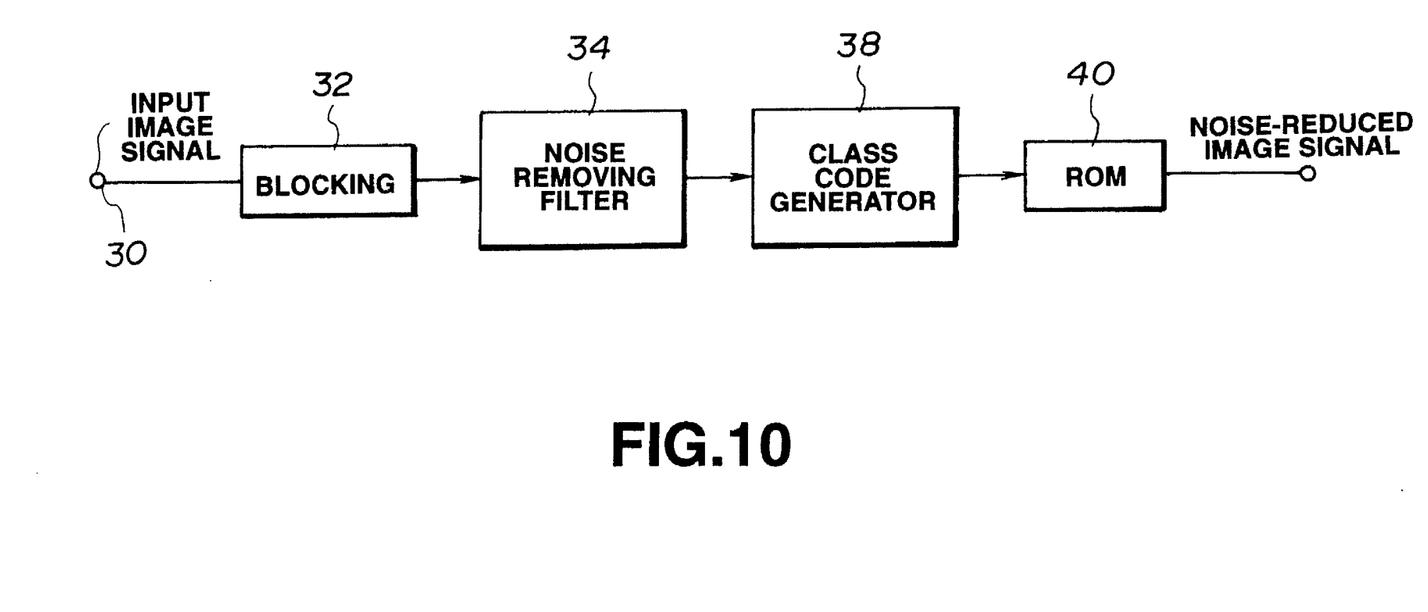
FIG. 10 is a block diagram of still another embodiment of an apparatus for producing a noise-reduced image signal from an input image signal in accordance with the present invention.

With reference now to FIG. 10, still another embodiment of an apparatus for producing a noise-reduced image signal from an input image signal is illustrated in block form therein. At an input terminal 30, the apparatus of FIG. 10 receives an input image signal whose noise level is to be reduced and supplies the input image signal therefrom to a blocking circuit 32. The blocking circuit produces a plurality of block signals from the input image signal each representing a portion of an image represented by the input image signal. Each of the block signals is supplied to a noise removing filter 34 of a type suitable for removing noise from an image signal which serves to produce a filtered block signal from each block signal supplied thereto by the blocking circuit 32. Each filtered block signal produced by the noise removing filter 34 is supplied to a class code generator 38 which produces a class code therefrom for identifying corresponding low noise image data stored in a ROM 40. The ROM 40 stores either low noise pixel data (compressed or uncompressed) or low noise block data (compressed or uncompressed) which it outputs selectively according to the class code applied thereto as a readout address (or from which a readout address is generated). As in the embodiments described above, ROM 40 may be replaced with another suitable memory device. The embodiment of FIG. 10 is useful for reducing the noise level of especially noisy pictures.

Figure 11:
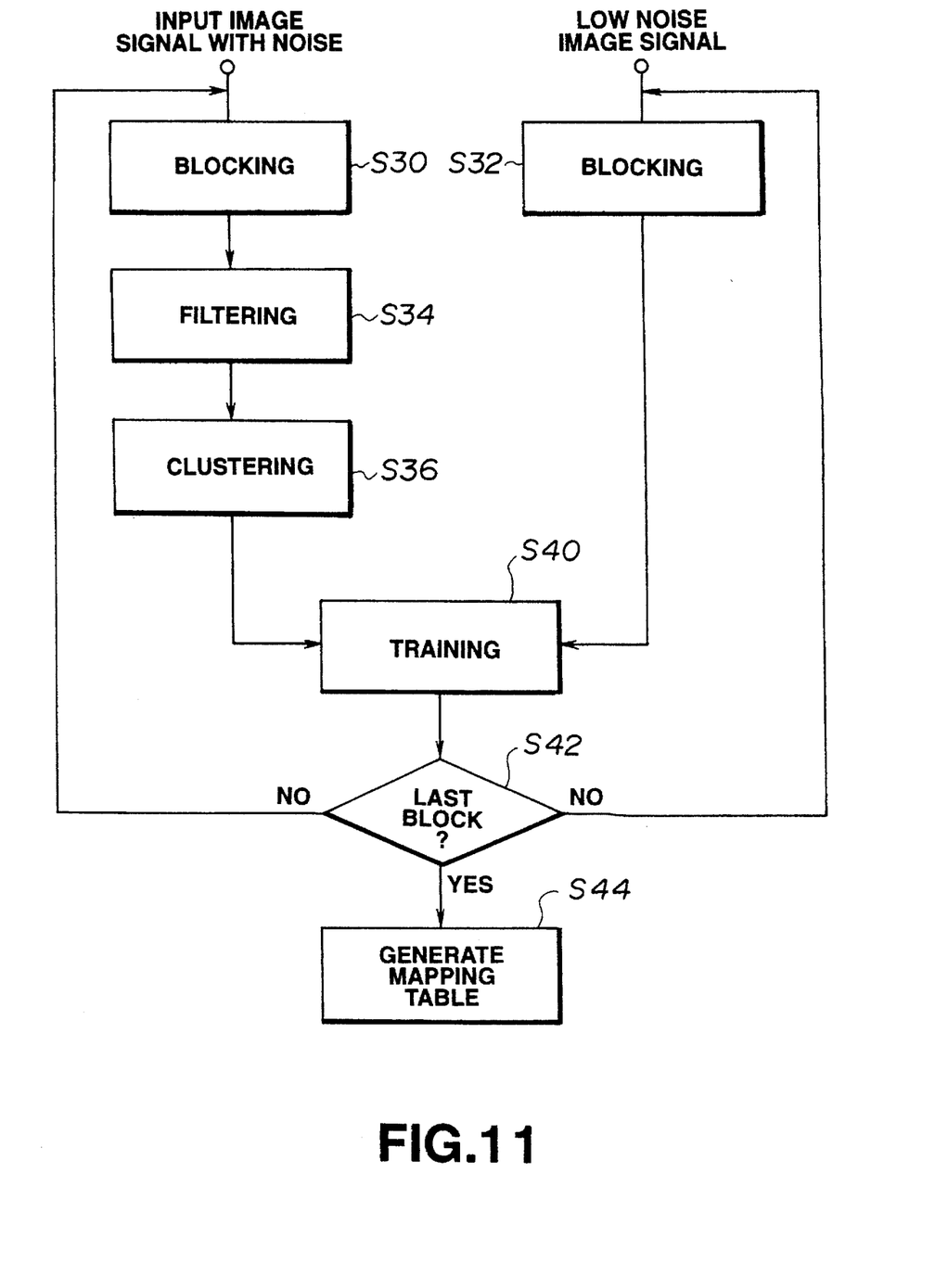
FIG. 11 is a flow chart for use in illustrating a training technique for the apparatus of FIG. 10.

A technique for training the system of FIG. 10 is illustrated in the flow chart of FIG. 11 in which an input image signal containing noise is separated into block signals in a step S30, and a corresponding low noise image signal representing the same image as the input image signal is likewise separated into blocks in a step S32. Each block signal produced in the step S30 is filtered in a step S34 in the same manner as block signals are filtered by the noise removing filter 34 of FIG. 10, to produce a filtered block signal from each block signal supplied in the blocking step S30. Each filtered block signal is subjected to clustering in a step S36 to produce a corresponding class code. In a step S40, the class code produced for each filtered block signal is matched with a corresponding block signal of the low noise image signal produced in the step S32 to produce a training data set. That is, if the ROM 40 is to store pixel data, each class code is matched with a pixel of the corresponding block signal of the low noise image signal, while if the ROM 40 stores block signals, each class code is matched with a corresponding block signal of the low noise image signal. Pixels and blocks (whether compressed or uncompressed) having the same class codes can be averaged in the step S40, selected ones can be retained and others disregarded, or fewer than all can be used to produce data to be stored in ROM 40. Other techniques for combining the pixels and block signals having corresponding class codes will be apparent from the foregoing discussion. The process represented by the steps S30 through S40 is repeated for each of the block signals until the last block has been processed, after which, as indicated in a step S42, a mapping table is generated in a step S44 and stored in the ROM 40.

Figure 12:
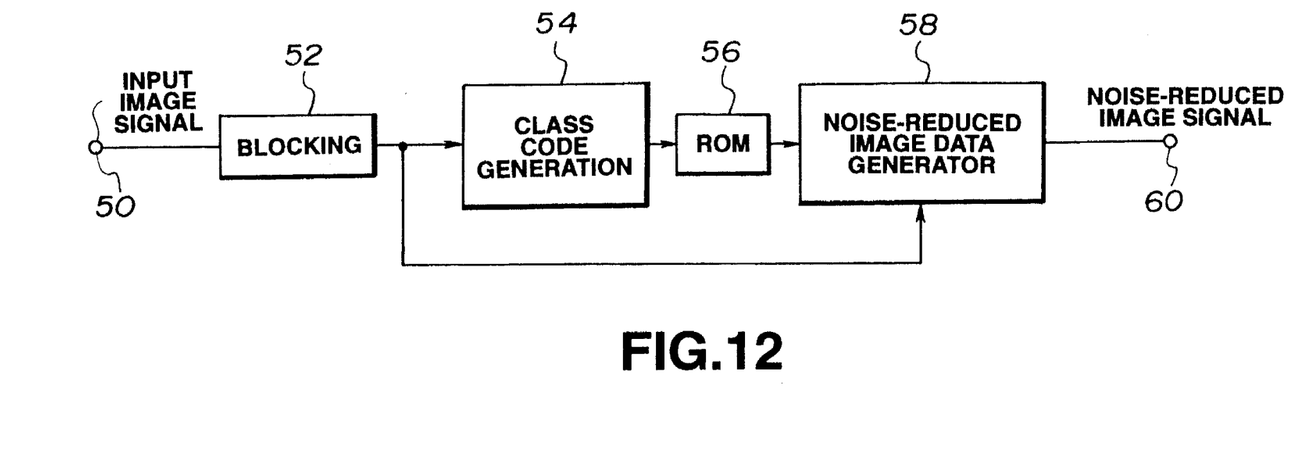
FIG. 12 is a block diagram of a still further embodiment of an apparatus for producing a noise-reduced image signal from an input image signal in accordance with the present invention.

FIG. 12 provides a block diagram of a further embodiment of an apparatus for reducing the noise level of an input image signal to produce a noise-reduced image signal, wherein the noise-reduced image signal is produced through a combination of coefficient data read from a ROM 56 and image data of the input image signal. The input image signal is received at an input terminal 50 from which it is supplied to a blocking circuit 52. The blocking circuit 52 serves to divide the input image signal into a plurality of block signals, either in compressed or uncompressed form, which it supplies to a class code generation circuit 54. In response to each block signal, the class code generation circuit 54 produces a corresponding class code which it supplies as an address to the ROM 56. Each class code produced by the circuit 54 identifies low noise image data representing a portion of an image and having a noise level lower than that of the block signal used to produce the class code.

As noted above, the ROM 56 stores coefficient data. More specifically, the ROM 56 (which may be replaced by an alternative memory device) stores a plurality of coefficient data sets each at a respective address associated with a corresponding class code. The coefficient data set includes a plurality of factors each of which is used by the noise-reduced image data generator circuit 58 to multiply a corresponding value of the block signal output from the blocking circuit 52 in order to produce corresponding low noise image data which the circuit 58 supplies to an output terminal 60 in the form of a noise reduced pixel, either in compressed or uncompressed form. Similarly to the blocking circuit 2 of FIG. 2, the blocking circuit 52 continues to produce block signals for each pixel of the input image signal, with the exception of those pixels along the edges thereof. Accordingly, the noise-reduced image data generator circuit 58 outputs pixels of the noise-reduced image signal to produce fields or frames thereof comprised of a sequence of pixel lines.

Training of the system of FIG. 12 is carried out in the manner in which the apparatus of FIG. 2 is trained, as illustrated in FIG. 4, with the following exceptions. Training is carried out to produce coefficient data sets comprising factors which when multiplied by the data of block signals output by the blocking circuit 52 produce a respective pixel of the noise-reduced image signal. A mapping table comprising the coefficient data sets is assembled and then stored in the ROM 56. The training step for the embodiment of FIG. 12 will be described hereinbelow in greater detail.

Figure 13:
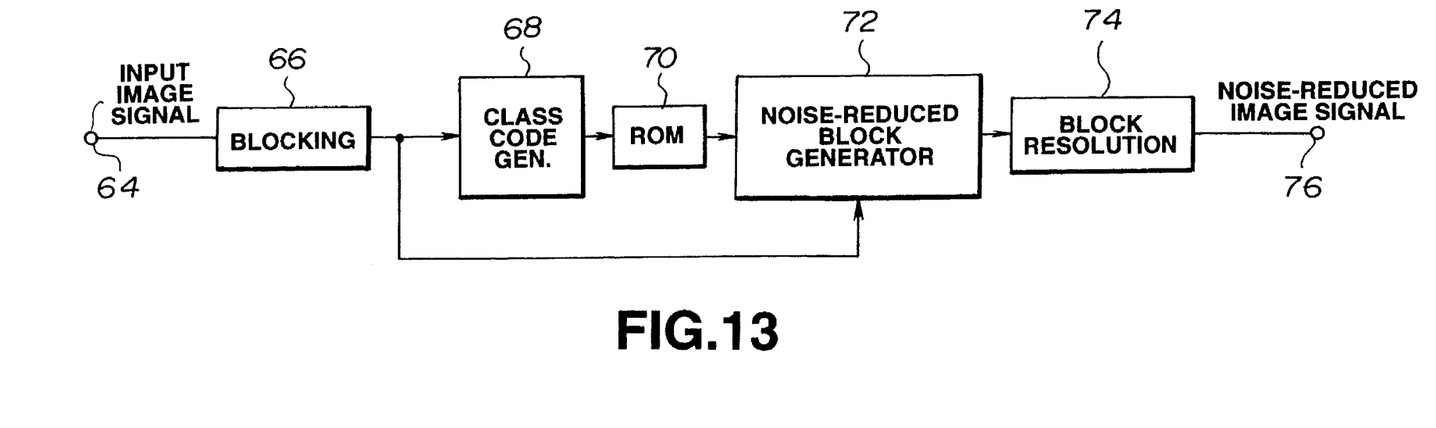
FIG. 13 is a block diagram of a yet still further embodiment of an apparatus for producing a noise-reduced image signal from an input image signal in accordance with the present invention.

FIG. 13 provides a block diagram of still another apparatus for reducing the noise in an input image signal to produce a noise-reduced image signal wherein a blocking circuit 66 divides an input image signal received at an input terminal 64 into plural block signals and supplies the block signals to a class code generating circuit 68. The class code generating circuit 68 produces a class code for each received block signal which identifies low noise image data stored in a ROM 70 in the form of a coefficient data set which may be combined with the block signal applied to the class code generator 68 in order to produce a block signal constituting a portion of a noise-reduced image signal representing the same image as the input image signal but having a reduced noise level. The ROM 70 (which may be replaced by another suitable memory device) reads out each coefficient data set in response to each class code and supplies the coefficient data set to a noise-reduced block generator circuit 72, which is also supplied with the corresponding block signal from the blocking circuit 66 to produce each noise-reduced block signal. The circuit 72 supplies each noise-reduced block signal to a block resolution circuit 74 which rearranges the received data to produce fields or frames of the noise-reduced image signal comprising a succession of pixel lines which it supplies at an output terminal 76.

The technique for training the apparatus of FIG. 13 corresponds with that of the apparatus of FIG. 12, except that the coefficient data sets, which are based on the low noise image signal and the corresponding input image signals (which have relatively more noise), are produced so that they are useful to generate block signals of the noise-reduced image signal by means of the circuit 72 of FIG. 13, rather than individual pixels.

The technique for training the apparatus of FIG. 13 is now explained. It is assumed that each pixel of a noise-reduced block signal to be produced by the circuit 72 will have a value $y_{os}$ which will be produced by a combination of factors $w_{1s}$ through $w_{ns}$ with pixel values $x_{IN1}$ through $x_{INn}$ of a block signal produced by the blocking circuit 66, according to the following relationship:

$$y_{os} = w_{1s}x_{IN1} + w_{2s}x_{IN2} + \ldots + w_{ns}x_{INn} \quad (2)$$

where s represents an index for identifying the respective pixel $y_{os}$ of the noise-reduced block signal to be output by the circuit 72. Training is carried out by clustering the blocks of the input image signal having a respective class code with the corresponding blocks of the low noise image signal representing the same image. Then each corresponding pixel of the low noise block signals corresponding to the same class code are used along with all the pixel values of the corresponding block signals of the input image signal (having relatively more noise) to produce the coefficient data to be stored in the ROM 56.

The method for obtaining the coefficient data is derived in the following manner. Each of the corresponding pixels of the low noise image signal is assumed to have a value equal to a value represented by a polynomial obtained by multiplying respective coefficient data values $w_1$ through $w_n$ (where n is the number of pixels in each block signal of the input image signal) by corresponding pixel values of a block signal of the input image signal, as expressed by the following relationship:

$$y_k = w_1 x_{k1} + w_2 x_{k2} + \ldots + w_n x_{kn} \quad (3)$$

wherein $y_k$ represents the corresponding pixel value of a respective block signal k of the low noise image signal, $x_{k1}$ through $x_{kn}$ represent the values of the various pixel data of the corresponding block signal of the input image signal and $w_1$ through $w_n$ represent the coefficient data values which are to be obtained.

If the number of block signals which yield the respective class code for these various block signals is equal to m, it will be appreciated that if m>n, the values of $w_1$ through $w_n$ will not be fixed unequivocally. Optimal values for the coefficient data $w_1$ through $w_n$ are, therefore, sought and for this purpose, the elements $e_k$ of an error vector e are obtained according to the following relationship:

$$e_k = y_k - (w_1 x_{k1} + w_2 x_{k2} + \ldots + w_n x_{kn}) \quad (4)$$

The values of the coefficients $w_1$ through $w_n$ are assumed to be those values which will minimize the error vector e, so that these coefficient values are determined according to the least squares method, expressed by the following relationship:

$$e^2 = \sum_{k=1}^{m} \{e_k\}^2 \quad (5)$$

Then the partial derivatives of both sides of relationship (5) above are obtained as follows:

$$\frac{\partial e^2}{\partial w_i} = \sum_{k=1}^{m} 2\left(\frac{\partial e_k}{\partial w_i}\right) e_k = \sum_{k=1}^{m} 2(x_{ki}) e_k \quad (6)$$

Since the minimum error occurs where all of the partial derivatives of relationship (6) above equal zero, the substitutions of relationships (7) and (8) below are made to yield the simultaneous linear equations represented by the matrix equation (9) below:

$$X_{ij} = \sum_{k=1}^{m} x_{ki} \cdot x_{kj} \quad (7)$$

$$Y_i = \sum_{k=1}^{m} x_{ki} \cdot y_k \quad (8)$$

-continued $$\begin{bmatrix} X_{11} & X_{12} & \ldots & X_{1n} \\ X_{21} & X_{22} & \ldots & X_{2n} \\ \ldots & \ldots & \ldots & \ldots \\ X_{n1} & X_{n2} & \ldots & X_{nn} \end{bmatrix} \begin{bmatrix} (W_1) \\ (W_2) \\ (W_3) \\ (W_4) \end{bmatrix} = \begin{bmatrix} (Y_1) \\ (Y_2) \\ (Y_3) \\ (Y_4) \end{bmatrix} \quad (9)$$

The matrix equation (9) is then solved, for example, by means of a sweep-out method, to find the optimal values of the various factors $w_1$ through $w_n$ and these values are stored in the ROM 70. Corresponding coefficient data sets are obtained for each respective pixel position of the corresponding low noise image signal blocks and all are stored according to the respective class code in the ROM 70.

Figure 14:
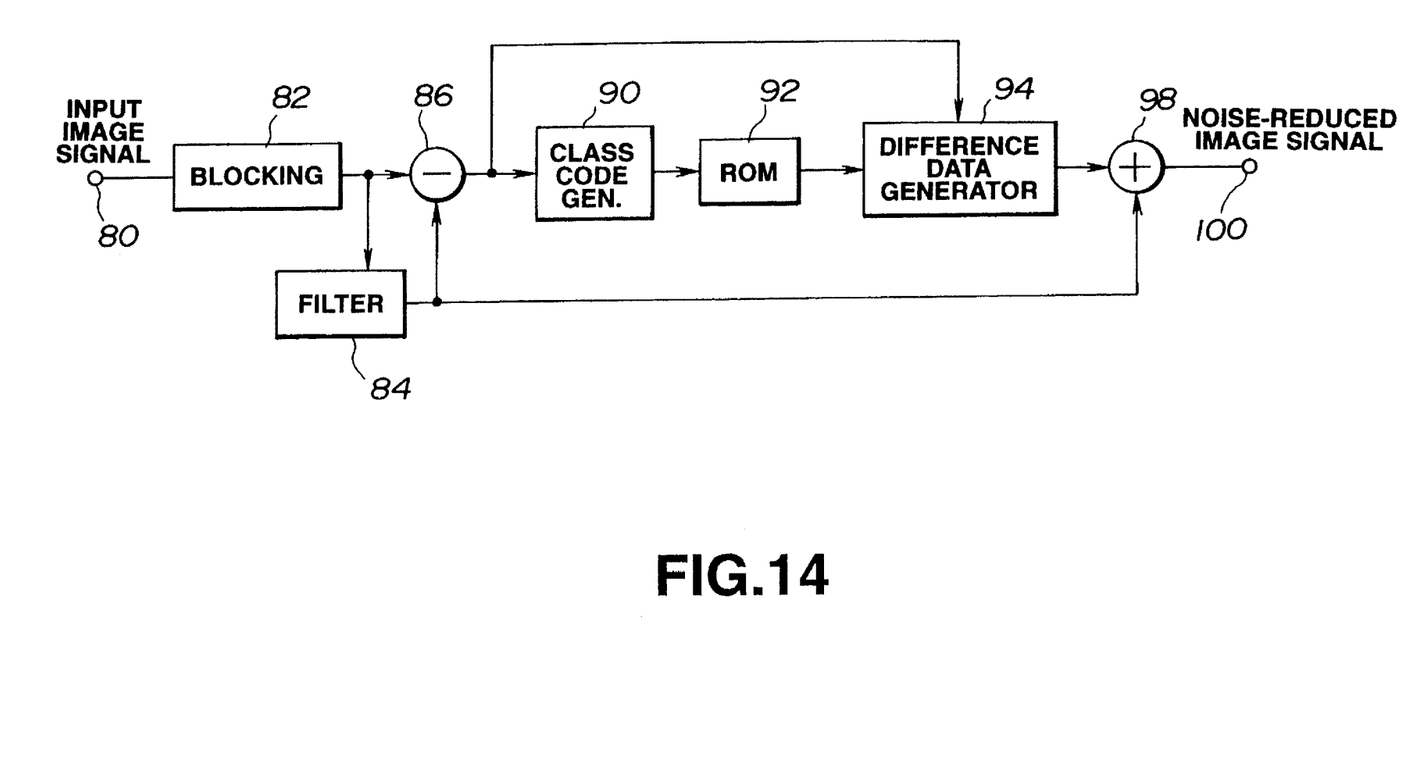
FIG. 14 is a block diagram of another embodiment of an apparatus for producing a noise-reduced image signal from an input image signal in accordance with the present invention.

The training technique for the apparatus of FIG. 12 is similar except that only a single set of coefficient data values are obtained and stored for each class code, since only a single low noise pixel is produced for each block signal produced by the blocking circuit 52 by the noise-reduced image data generator 58. FIG. 14 illustrates a further apparatus for producing a noise-reduced image signal from an input image signal having a higher noise level. The input image signal is received at an input terminal 80 and supplied therefrom to a blocking circuit 82 which divides the input image signal into a plurality of block signals. The block signals are supplied by the blocking circuit 82 both to a filter 84 suitable for filtering image signals to remove noise (similar to filter 14 of FIG. 8) and to a first input of a subtracting circuit 86. The filter 84 produces filtered block signals from the received block signals and supplies these to a further input of the subtracting circuit 86. The subtracting circuit 86 produces difference block signals from each of the block signals output by the blocking circuit 82 and its corresponding filtered block signal.

Each class code is supplied by the subtracting circuit 86 to a class code generator 90 which produces a class code for each difference block signal. Each class code identifies low noise difference image data representing a difference between a low noise block signal corresponding to the block signal produced by the blocking means 82 for which the class code was produced and a filtered block signal produced from the block signal output by the blocking means 82. A ROM 92 (or other suitable storage device) stores a plurality of coefficient data sets each at a respective address associated with a corresponding class code. Each coefficient data set includes a number of factors for each multiplying a corresponding value included in the difference block signal for which the code was produced, in order to yield the value of a corresponding low noise difference block signal. The ROM 92 reads out a coefficient data set in response to each class code provided by the class code generator 90 to a difference data generator 94 which is also provided with the difference block signal produced by the subtracting circuit 86. The difference data generator 94 produces each of the low noise image data based on a difference block signal and its corresponding coefficient data set by multiplying each factor of the coefficient data set by a corresponding value of the difference block signal and summing the products. The low noise difference data produced by the generator 94 is supplied thereby to an input of an adding circuit 98 which receives the filtered block signal at a second input and sums the two signals to produce a pixel of the noise-reduced image signal which it supplies at an output 100.

Figure 9:
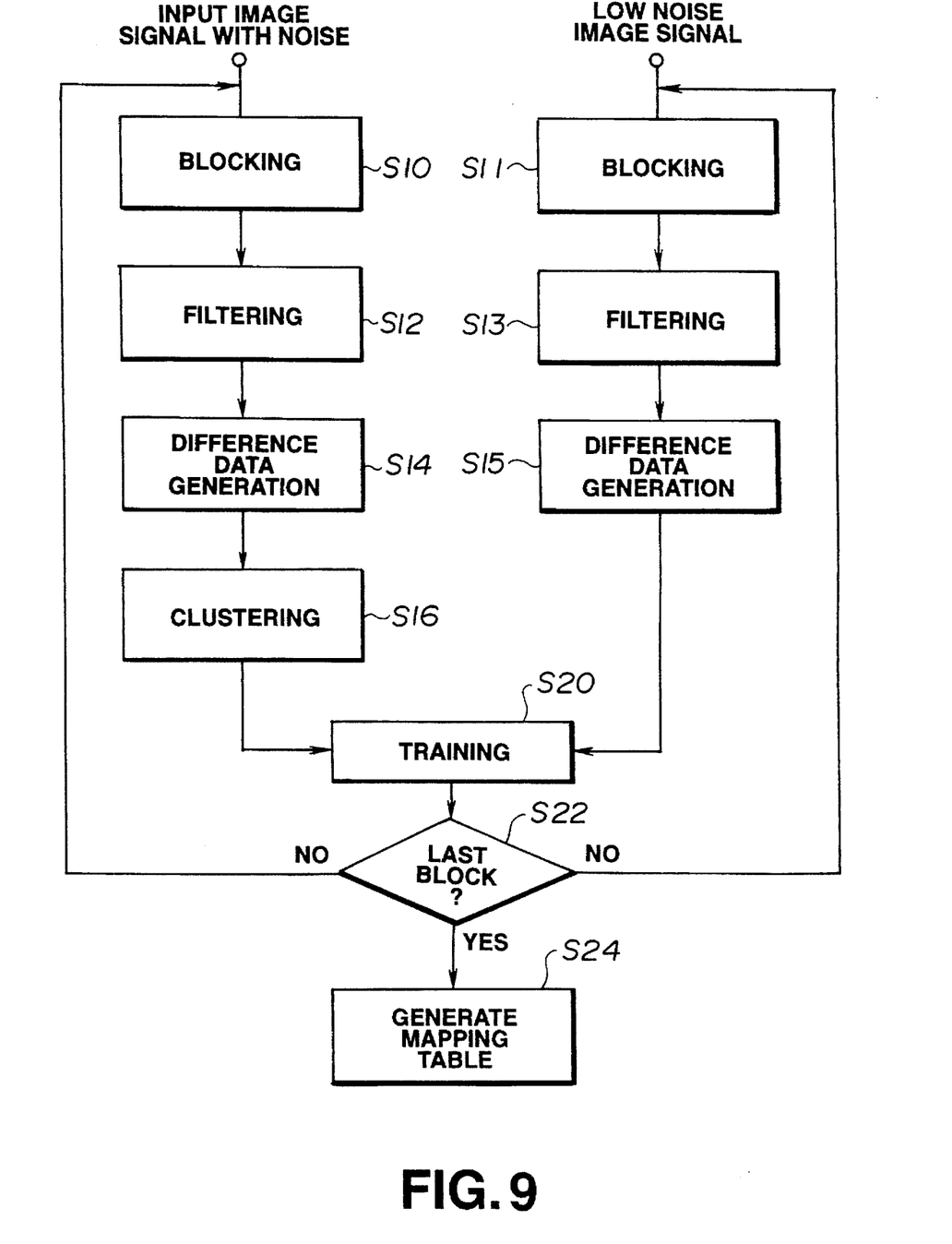
FIG. 9 is a flow chart for use in illustrating a training technique for the apparatus of FIG. 8.

Training of the apparatus of FIG. 14 is carried out in a manner similar to that of the FIG. 8 apparatus as illustrated in FIG. 9, except that the training step S20 is performed to produce coefficient data using the data from difference block signals.

Figure 15:
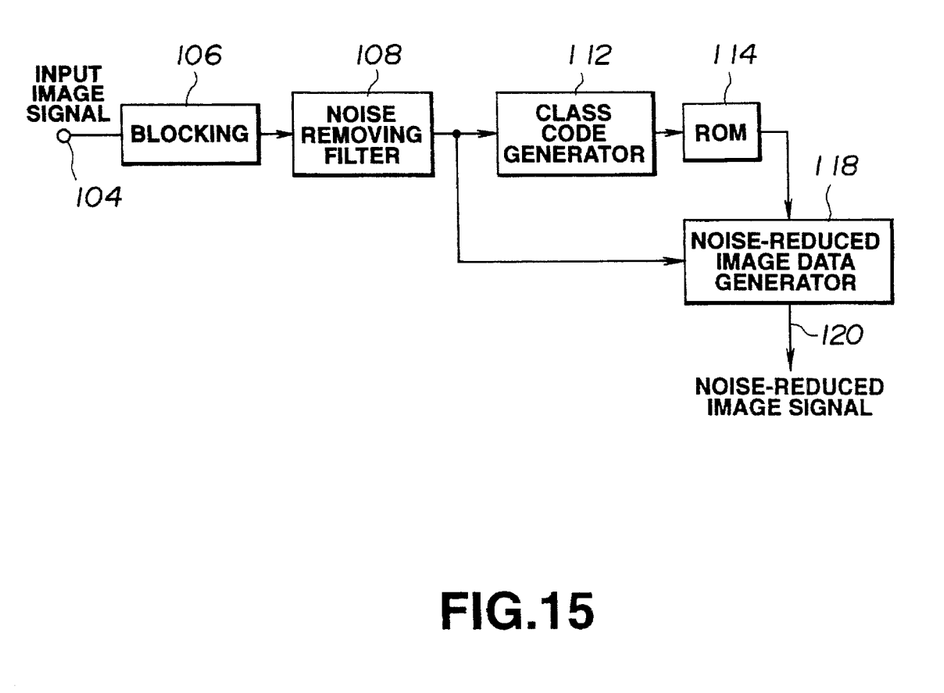
FIG. 15 is a block diagram of a further embodiment of an apparatus for producing a noise-reduced image signal from an input image signal in accordance with the present invention.

A further embodiment of an apparatus for producing a noise-reduced image signal from an input image signal having relatively more noise is illustrated in block form in FIG. 15. In the apparatus of FIG. 15, the input image signal is received at an input terminal 104 and supplied therefrom to a blocking circuit 106 which divides the input image signal into a plurality of block signals, each of which is then provided to a noise removing filter 108 suitable for reducing noise in image signals. The filter 108 produces a filtered block signal from each block signal supplied thereto and applies each filtered block signal to a class code generator 112.

The class code generator 112 produces a class code for each corresponding filtered block signal. Each class code identifies low noise image data having a noise level lower than that of the block signal from which the corresponding filtered block signal was formed and for which the class code was produced. The class code generator 112 supplies each code to a ROM 114 (or other suitable storage device) which stores a plurality of coefficient data sets each at a respective address associated with a corresponding class code. The ROM 114 reads out a coefficient data set in response to each class code to a noise-reduced image data generator 118, which is also supplied with the filtered block signal for which the corresponding class code was produced. The noise-reduced image data generator 118 produces a low noise pixel of the noise-reduced image signal by multiplying each factor of the coefficient data set by a corresponding value of the filtered block signal and summing the various products. The generator 118 supplies the pixels in succession at an output terminal 120. It will be appreciated that instead the ROM 114 may store coefficient data sets for producing low noise block signals instead of individual pixels and the noise-reduced image data generator will then be arranged to produce such block signals from each coefficient data set and the corresponding filtered block signal.

The present invention provides advantageous apparatus for producing noise-reduced image data from an input image signal which minimizes picture deterioration and which achieves noise reduction satisfactorily without regard to the shape or content of the image. The invention is adaptable to may different types of systems so that it is effective to reduce noise resulting from the particular noise sources inherent in each system.

It will be appreciated that the various embodiments disclosed above may be implemented by hardwired circuits (such as ASIC's and the like), programmable devices (such as microprocessors, microcomputers, digital signal processors and the like) or a combination of hardwired circuits and programmable devices.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for producing a noise-reduced image signal from an input image signal having relatively more noise than the noise-reduced image signal, comprising:

block producing means for producing a plurality of noise-containing block signals from the input image signal, each of the noise-containing block signals representing a portion of an image represented by the input image signal;

class code producing means for producing a class code for each of the plurality of noise-containing block signals, each class code identifying low noise image data corresponding with an image portion and having a noise level lower than that of a noise-containing block for which the class code was produced; and noise-reduced image signal producing means for producing the noise-reduced image signal based on the class codes produced by the class code producing means.

2. The apparatus of claim 1, wherein the noise-reduced image signal producing means comprises: a memory storing the low noise image data at respective addresses associated with the class codes thereof, the memory being operative to read out selected low noise image data in response to class codes produced by the class code producing means to produce said noise-reduced image signal.

3. The apparatus of claim 2, wherein each class code identifies a pixel as said low noise image data and the memory stores a plurality of pixels each identified by a respective class code and is operative to read out selected ones of the plurality of pixels as said low noise image data in response to the class codes produced by the class code producing means.

4. The apparatus of claim 3, wherein the memory stores the plurality of pixels in data compressed form.

5. The apparatus of claim 2, wherein each class code identifies a respective low noise block signal as said low noise image data, and the memory stores a plurality of low noise block data at respective addresses associated with the class codes thereof and is operative to read out selected ones of the low noise block data in response to the class codes produced by the class code producing means.

6. The apparatus of claim 5, further comprising means for converting each of the selected low noise block data read out by the memory into a noise-reduced image signal arranged as a sequence of image signal lines.

7. The apparatus of claim 2, wherein the low noise image data identified by each class code and stored in the memory comprise compressed image data.

8. The apparatus of claim 1, further comprising:
filtering means for producing a corresponding filtered block signal from each of the plurality of noise-containing block signals; and
difference signal producing means for producing a noise-containing difference block signal from each of the plurality of noise-containing block signals and its corresponding filtered block signal;
wherein the class code producing means is operative to produce each class code based on a respective noise-containing difference block signal, the class code produced by the class code producing means identifying low noise difference image data representing a difference between (A) low noise image data representing an image portion and having a noise level lower than the noise-containing block signal corresponding to the noise-containing block difference signal on which the class code is based and (B) a filtered signal produced by filtering the low noise image data; and
wherein the noise-reduced image signal producing means comprises a memory storing the plurality of low noise difference image data at respective addresses associated with the class codes thereof, the memory being operative to read out selected low noise difference image data in response to the class codes produced by the class code producing means; and
adding means for adding the selected low noise difference image data with data of corresponding filtered block signals to produce said noise-reduced image signal.

9. The apparatus of claim 1, wherein the noise reduced image signal producing means comprises:
a memory storing a plurality of coefficient data sets each at a respective address associated with a corresponding class code thereof, each coefficient data set including a plurality of factors for each multiplying a corresponding value included in a noise-containing block signal to produce corresponding low noise image data, the memory being operative to read out selected ones of the plurality of coefficient data sets in response to class codes produced by the class code producing means; and
means for producing a plurality of low noise image data based on the plurality of noise-containing block signals and corresponding coefficient data sets output by the memory to produce said noise-reduced image signal.

10. The apparatus of claim 9, wherein each class code identifies a pixel as said low noise image data and the means for producing said plurality of low noise image data is operative to produce the pixel identified by a respective class code based on a noise containing block signal for which the respective class code was produced and a coefficient data set read from the memory in response to the respective class code.

11. The apparatus of claim 9, wherein each class code identifies a respective low noise block signal as said low noise image data, and the means for producing said plurality of low noise image data is operative to produce each of a plurality of respective low noise block signals identified by a respective class code based on a noise containing block signal for which the respective class code was produced and a coefficient data set read from the memory in response to the respective class code.

12. The apparatus of claim 11, further comprising means for converting the respective low noise block signals into a noise-reduced image signal arranged as a sequence of image signal lines.

13. The apparatus of claim 1, further comprising:
filtering means for producing a corresponding filtered block signal from each of the plurality of noise-containing block signals;
difference signal producing means for producing a noise-containing difference block signal from each of the plurality of noise containing block signals and its corresponding filtered block signal;
wherein the class code producing means is operative to produce each class code based on a respective noise-containing difference block signal, the class code produced by the class code producing means identifying low noise difference image data representing a difference between (A) low noise image data representing an image portion and having a noise level lower than the noise-containing block signal corresponding to the noise-containing difference block signal on which the class code is based and (B) a filtered signal produced by filtering the low noise image data; and
wherein the noise-reduced image signal producing means comprises a memory storing a plurality of coefficient data sets each at a respective address associated with a corresponding class code thereof, each coefficient data set including a plurality of factors for each multiplying a corresponding value included in a noise-containing difference block signal to produce a value of a corresponding low noise difference block signal, the memory being operative to read out selected ones of the plurality of coefficient data sets in response to class codes produced by the class code producing means;

means for producing a plurality of low noise difference image data based on the noise-containing difference block signals and corresponding coefficient data sets output by the memory; and means for adding the plurality of low noise difference image data with data of corresponding filtered block signals to produce said noise-reduced image signal.

14. The apparatus of claim 1, further comprising:

filtering means for producing a corresponding filtered block signal from each of the plurality of noise-containing block signals;

wherein the class code producing means is operative to produce said class code based on the corresponding filtered block signal of each of the plurality of noise-containing block signals; and wherein the noise-reduced image signal producing means comprises a memory storing the low noise image data at respective addresses associated with the class codes thereof, the memory being operative to read out selected low noise image data in response to class codes produced by the class code producing means to produce said noise-reduced image signal.

15. The apparatus of claim 1, further comprising:

filtering means for producing a corresponding filtered block signal from each of the plurality of noise-containing block signals;

wherein the class code producing means is operative to produce said class code based on the corresponding filtered block signal of each of the plurality of noise-containing block signals; and wherein the noise-reduced image signal producing means comprises a memory storing a plurality of coefficient data sets each at a respective address associated with a corresponding class code thereof, each coefficient data set including a plurality of factors for each multiplying a corresponding value included in a filtered block signal to produce corresponding low noise image data, the memory being operative to read out selected ones of the plurality of coefficient data sets in response to class codes produced by the class code producing means; and means for producing a plurality of low noise image data based on the filtered block signals and corresponding coefficient data sets output by the memory to produce said noise-reduced image signal.

* * * * *